United States Patent
Penzo et al.

(10) Patent No.: US 12,317,387 B2
(45) Date of Patent: May 27, 2025

(54) SMART LED DRIVER SOLUTION FOR DYNAMIC LED CHAIN

(71) Applicant: Infineon Technologies AG, Neubiberg (DE)

(72) Inventors: Roberto Penzo, Vigonza (IT); Maurizio Galvano, Padua (IT)

(73) Assignee: Infineon Technologies AG, Neubiberg (DE)

( * ) Notice: Subject to any disclaimer, the term of this patent is extended or adjusted under 35 U.S.C. 154(b) by 186 days.

(21) Appl. No.: 18/151,997

(22) Filed: Jan. 9, 2023

(65) Prior Publication Data

US 2024/0237171 A1    Jul. 11, 2024

(51) Int. Cl.
*H05B 45/52* (2020.01)
*H02M 1/32* (2007.01)
*H05B 45/37* (2020.01)

(52) U.S. Cl.
CPC .............. *H05B 45/52* (2020.01); *H02M 1/32* (2013.01); *H05B 45/37* (2020.01)

(58) Field of Classification Search
CPC ..... H02M 1/32; H05B 45/37; H05B 45/3725; H05B 45/50; H05B 45/52
See application file for complete search history.

(56) References Cited

U.S. PATENT DOCUMENTS

| | | |
|---|---|---|
| 9,203,311 B2 | 12/2015 | Penzo et al. |
| 9,763,296 B1 | 9/2017 | Milanesi et al. |
| 10,420,178 B2 | 9/2019 | Milanesi et al. |
| 11,382,198 B2 | 7/2022 | Galvano et al. |
| 2018/0177013 A1 | 6/2018 | Weber et al. |
| 2021/0392730 A1* | 12/2021 | Galvano ................... F21S 4/26 |
| 2022/0276285 A1* | 9/2022 | Rashid ................. H03G 3/3042 |
| 2024/0147591 A1* | 5/2024 | Zhu ....................... H05B 45/397 |
| 2024/0210975 A1* | 6/2024 | Schaef ................ H02M 1/0045 |
| 2024/0298388 A1* | 9/2024 | Stevens, Jr. ............. H05B 45/39 |

FOREIGN PATENT DOCUMENTS

JP    2020045047 A    3/2020

OTHER PUBLICATIONS

Szolusha, "Single 2 MHz Buck-Boost Controller Drives Entire LED Headlight Cluster, Meets CISPR 25 Class 5 EMI," Analog Devices, 52-05, retrieved from https://www.analog.com/media/en/analog-dialogue/volume-52/number-2/single-2mhz-buck-boost-controller-drives-entire-led-headlight-cluster-meets-cispr25-class5-emi.pdf, May 2018, 6 pp.

* cited by examiner

*Primary Examiner* — Raymond R Chai

(74) *Attorney, Agent, or Firm* — Shumaker & Sieffert, P.A.

(57) ABSTRACT

Circuitry configured to deliver an adjustable discharge current to a compensation node of a power converter that supplies a load, which may speed up the power to the load on the new steady state condition, while maintaining the stable response time of the power converter. A driver circuit may measure current to the load and perform overshoot protection for the load. The overshoot protection may also generate a pattern of detectable square wave pulses. The circuitry of this disclosure may adjust the discharge current based on a duration of the pulses in the pattern of pulses, as well as based on a pulse density of the pulses.

20 Claims, 10 Drawing Sheets

SMART LED DRIVER SOLUTION FOR DYNAMIC LED CHAIN

TECHNICAL FIELD

The disclosure relates to circuits for driving and controlling strings of light-emitting diodes (LEDs).

BACKGROUND

Drivers are often used to control a voltage, current, or power at a load. For instance, a light-emitting diode (LED) driver may control the power supplied to a load comprising a string of light-emitting diodes. Some drivers may include a Direct Current (DC) to DC power converter, such as a buck-boost, buck, boost, or another DC-to-DC converter. Such DC-to-DC power converters may be used to control and possibly change the power at the load based on a characteristic of the load and may regulate current through the load.

SUMMARY

In general, this disclosure describes devices, systems, and techniques for controlling an amount of electrical current delivered to a load which may include one or more light-emitting diodes (LEDs). For example, controller may operate the one or more LEDs to switch the one or more LEDs from a first lighting mode to a second lighting mode. In response to the controller switching from the first lighting mode to the second lighting mode, a driver circuit for the load may adjust the power supplied to the load, e.g., cause a power converter configured to deliver power to the load to change an amount of output power. In some examples the second lighting mode may use less power than the first lighting mode and the driver circuit may reduce the supplied power.

The driver circuit may include overshoot protection to prevent the overshoot of the supplied power, e.g., a current overshoot, from damaging the one or more LEDs during a change in lighting mode. However, for circuit stability, the power converter may respond more slowly to reduce power supplied to the load, compared to the response time of the driver circuit. Therefore, during some load reductions, such as the first lighting mode to the second lighting mode, the power converter may continue to deliver more power than needed during the transition, which may result in undesirable circuit behavior, such as oscillations. The circuitry of this disclosure may include a circuit to deliver an additional auto-adjustable discharge current to a compensation node of the power converter, which may speed up adjusting the power to the load for the new steady state condition, while maintaining the stable response time of the power converter.

In one example, this disclosure describes a circuit configured to control power delivered to a load comprising a power converter comprising a compensation terminal, wherein the power converter is configured to generate an output electrical current, wherein at least a portion of the output electrical current flows through the load; a switching device; a sensor configured to generate an electrical signal to indicate a magnitude of the electrical current through the load; and a driver circuit configured to protect the load from overshoot of the electrical current, wherein to protect from overshoot of the electrical current, the driver circuit is configured to: compare the magnitude of the electrical current through the load to an overshoot trigger threshold; in response to determining that the magnitude of the electrical current through the load satisfies the overshoot trigger threshold, cause the switching device to turn on and redirect an undesired electrical current through the switching device, wherein the output electrical current is split into the undesired electrical current through the switching device and a desired electrical current, wherein the desired electrical current continues to flow through the load; and apply an adjustable discharge current to the compensation terminal of the power converter, wherein the adjustable discharge current is separate from the output electrical current generated by the power converter.

In another example, this disclosure describes a system configured to control power delivered to a load comprising a power source; a load controller configured to control operation of the load; a power converter comprising a compensation terminal, wherein the power converter is configured to generate an output electrical current, wherein at least a portion of the output electrical current flows through the load; a switching device; a sensor configured to generate an electrical signal to indicate a magnitude of the electrical current through the load; and a driver circuit configured to protect the load from overshoot of the electrical current, wherein to protect from overshoot of the electrical current, the driver circuit is configured to: compare the magnitude of the electrical current through the load to an overshoot trigger threshold; in response to determining that the magnitude of the electrical current through the load satisfies the overshoot trigger threshold, cause the switching device to turn on and redirect an undesired electrical current through the switching device, wherein the f the output electrical current is split into the undesired electrical current through the switching device, and a desired electrical current, wherein the desired electrical current continues to flow through the load; and apply an adjustable discharge current to the compensation terminal of the power converter, wherein the adjustable discharge current is separate from the electrical current generated by the power converter.

In another example, this disclosure describes a method of protecting a load from electrical current overshoot comprising receiving, from a sensor, an electrical signal indicating a magnitude of an output electrical current, wherein at least some of the output electrical current flows through the load, and wherein a power converter comprising a compensation terminal, delivers the output electrical current; comparing the indicated magnitude of the electrical current through the load to an overshoot trigger threshold; in response to determining that the magnitude of the first portion of the electrical current through the load satisfies the overshoot trigger threshold: causing a switching device to turn on and splitting the first portion of the electrical current into: an undesired electrical current through the switching device; and a desired electrical current, wherein the desired electrical current continues to flow through the load; and delivering an adjustable discharge current to the compensation terminal of the power converter, wherein the adjustable discharge current is separate from the electrical current generated by the power converter.

The details of one or more examples of the disclosure are set forth in the accompanying drawings and the description below. Other features, objects, and advantages of the disclosure will be apparent from the description and drawings, and from the claims.

DETAILED DESCRIPTION

The circuitry of this disclosure may deliver an adjustable discharge current to a compensation node of a power converter that supplies a load, which may speed up adjusting the power to the load for the new steady state condition, while maintaining the stable response time of the power converter. A driver circuit may measure current to the load and perform overshoot protection for the load, which may also generate a pattern of square wave pulses. The circuitry of this disclosure may adjust the discharge current based on a duration of the pulses in the pattern of pulses, as well as based on a pulse density of the pulses.

Figure 1:
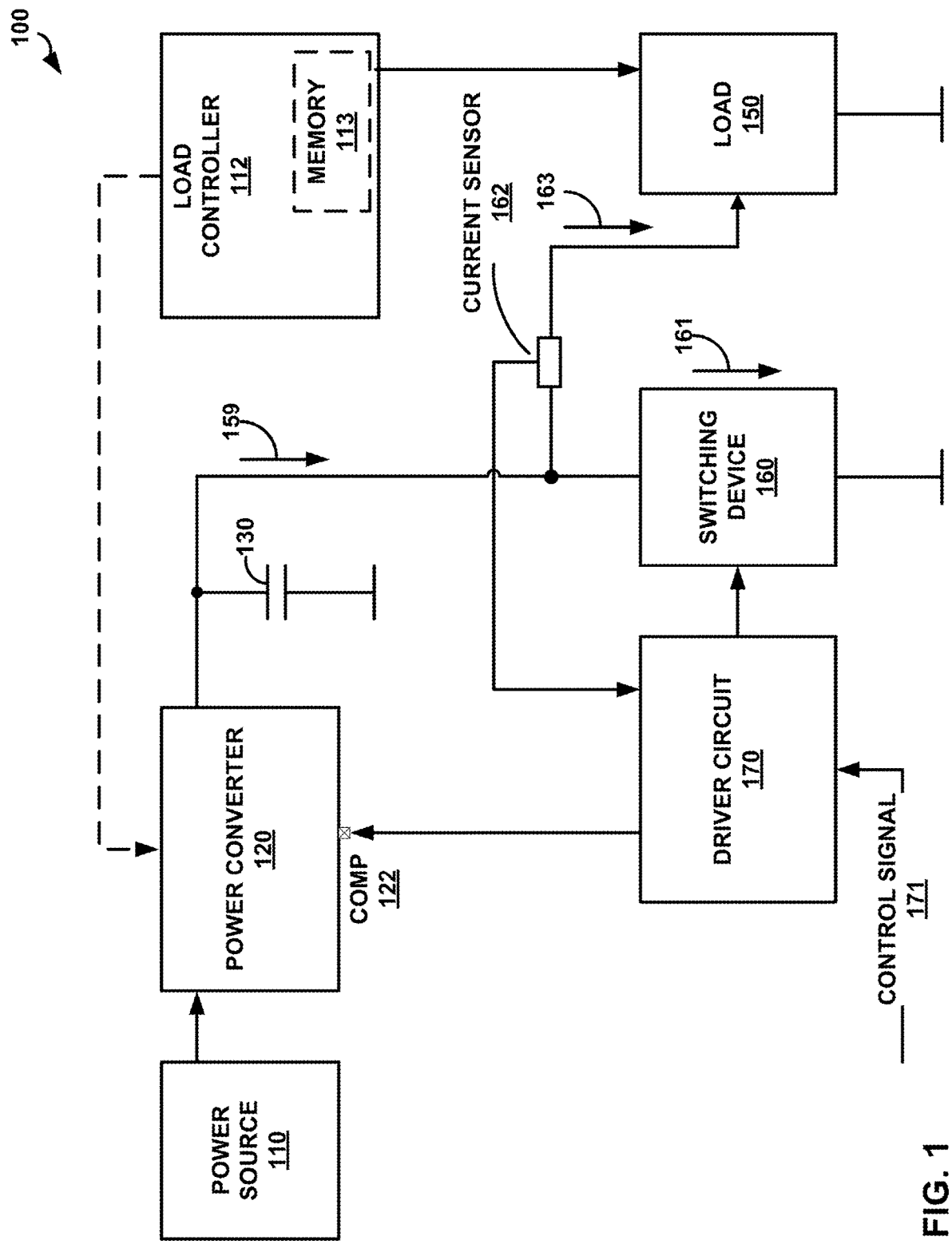
FIG. 1 is a block diagram illustrating and example system configured to control power delivered to a load according to one or more techniques of this disclosure.

FIG. 1 is a block diagram illustrating an example system 100 for controlling an electrical signal delivered from a power converter 120 to a load 150 configured to operate in various modes and may consume different amounts of power depending on the operating mode. In some examples, load 150 may include a set of light emitting diodes (LEDs) that may be activated or bypasses based on the operating mode. In the example of FIG. 1, system 100 includes a power source 110, load controller 112, power converter 120, a capacitor 130, load 150, switching device 160, current sensor 162, and driver circuit 170.

System 100 may be configured to supply power to load 150 to support the operating modes of load 150. The example of FIG. 1 may focus on a set of LEDs to simplify the explanation, but the techniques of this disclosure may apply to many different loads. For example, a load may be a processing circuitry, such as a microprocessor configured to operate within a range of operating voltages, but may switch operating modes, such as sleep mode, sensor receive, signal processing and other modes which may consume different power levels. For example, switching from a relatively high power consumption mode, like signal processing, to a relatively minimal power consumption mode like sleep mode.

In the example of system 100, power converter 120 may supply power to load 150 to cause the LEDs of load 150 to emit light. Load 150 may include one or more lighting modes, where each lighting mode of the one or more lighting modes requires a respective electrical signal. For example, the one or more lighting modes may include a low-light mode and a high-light mode. Switching load 150 from the high-light mode to the low-light mode may include shorting at least one of the LEDs to decrease an amount of light emitted by load 150. Shorting at least one of the LEDs may cause an overshoot of an electrical current delivered from power converter 120 to load 150. System 100 may sink at least a portion of the electrical current delivered from power converter 120 to load 150 to prevent load 150 from being damaged by the electrical current.

Power source 110 is configured to deliver operating power to power converter 120. In some examples, power source 110 includes a battery and a power generation circuit to produce operating power. In some examples, power source 110 is rechargeable to allow extended operation. Power source 110 may include any one or more of a plurality of different battery types, such as nickel cadmium batteries and lithium-ion batteries. In some examples, power source 110 supplies power within a range from 5 Watts (W) to 50 W.

Controller 112 may include processing circuitry configured to implement functionality and/or process instructions for execution within system 100. For example, controller 112 may execute programming instructions stored in a memory, such as memory 113. In other examples, memory 113 may be external to load controller 112 (not shown in FIG. 1). Controller 112 may include, for example, processing circuitry such as microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, controller 112 may include any suitable structure, whether in hardware, software, firmware, or any combination thereof, to perform the functions ascribed herein.

In some examples, a computer readable storage device, such as memory 113 may be configured to store information within system 100 during operation. The memory may include a computer-readable storage medium or computer-readable storage device. In some examples, the memory includes one or more of a short-term memory or a long-term memory. The memory may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, memory 113 may to store program instructions or data during operation of controller 112.

Power source 110 may supply an input electrical signal to power converter 120. Furthermore, power converter 120 may deliver at least a portion of an output electrical signal to first load 150, which represent a load supplied with energy by power converter 120. The input electrical signal, in some cases, may include an input current and an input voltage. Additionally, the output electrical signal may include an output current and an output voltage. In some cases, power converter 120 may be implemented as a DC-to-DC power converter, or similar power converter, configured to regulate an electrical signal received by load 150. In some examples, the DC-to-DC power converter includes a switch/inductor unit such as an H bridge. An H bridge uses a set of switches, often semiconductor switches, to convert electrical power. In some examples, the switch/inductor unit acts as a buck-boost converter. For instance, a buck-boost converter is configured to regulate the electrical signal received by load 150 using at least two operational modes including a buck mode and a boost mode. Power converter 120 may control semiconductor switches of the buck-boost converter to alternate the mode of the buck-boost converter (e.g., change the operation mode of the buck-boost converter from buck mode to boost mode and vice versa).

In some examples, load controller 112 (controller 112, for short) may be configured to output one or more signals directly to control power converter 120 to deliver a desired amount of electrical current to load 150, but this is not required. In some examples, power converter 120 operates without receiving direct signals from controller 112. That is, power converter 120 is configured to operate independently from controller 112.

In some examples, power converter 120 may be also configured operate based on one or more signals received from driver circuit 170. In other examples, rather than operating based on one or more signals received from controller 112, power converter 120 may control an electrical current output from power converter 120 according to a feedback loop including current sensor 162 and driver circuit 170. In this manner, power converter 120 may control electrical current output from power converter 120 in real-time or near real-time based on an electrical current sensed by current sensor 162. Driver circuit 170 may be configured to receive an electrical signal generated by current sensor 162 that indicates a magnitude of electrical current 163.

Switching circuitry of power converter 120 may include the components such as transistors, diodes, or other semiconductor elements. In buck mode, the buck-boost converter of power converter 120 may step down voltage and step up current from the input of power converter 120 to the output of power converter 120. In boost mode, the buck-boost converter of power converter 120 may step up voltage and step down current from the input of power converter 120 to the output of power converter 120. In some examples, power converter 120 is configured to regulate a current of the electrical signal received by load 150 such that a current of the electrical signal remains substantially constant.

In some examples, power converter 120 may supply power to load 150 using output capacitor 130. Capacitor 130 is an electrical circuit component configured for storing electric potential energy. Capacitor 130 may in some examples, occupy a "charged" state, where capacitor 130 stores an amount of electric potential energy. Additionally, capacitor 130 may occupy a "discharged" state where capacitor 130 stores little or no electric potential energy. Capacitor 130 may also transition between the charged state and the discharged state. When capacitor 130 is charging, a current flows across capacitor 130, increasing the electric potential energy stored by capacitor 130. When capacitor 130 is discharging, the electric potential energy stored by capacitor 130 is released, causing capacitor 130 to emit an electric current.

Capacitor 130 may operate as an output capacitor for power converter 120. For example, power converter 120 may charge and discharge capacitor 130 in cycles so that a discharge of capacitor 130 delivers a desired amount of electrical current to load 150. For example, when load 150 are operating in a high-light mode, power converter 120 may charge capacitor 130 to a first charge level, and when load 150 are operating in a low-light mode, power converter 120 may charge capacitor 130 to a second charge level, where the first charge level is greater than the second charge level.

In some examples, a high light mode may deliver power to relatively more LEDs when compared to a low light mode.

When controller 112 toggles load 150 from the high-light mode to the low-light mode, however, power converter 120 might not be able to instantly change an amount of charge in capacitor 130. As such, if capacitor 130 discharges shortly after controller 112 toggles load 150 from the high-light mode to the low-light mode, the electrical current received by load 150 in response to the discharge of capacitor 130 may represent an overshoot electrical current. System 100 may sink at least a portion of the overshoot electrical current to prevent the overshoot electrical current from damaging load 150.

The LEDs of load 150 may include any one or more suitable semiconductor light sources. In some examples, an LED of load 150 may include a p-n junction configured to emit light when activated. In some examples, load 150 may be included in a headlight assembly for automotive applications. For instance, load 150 may include a matrix, a string, or more than one string of light-emitting diodes to light a road ahead of a vehicle. As used herein, a vehicle may refer to motorcycles, trucks, boats, golf carts, snowmobiles, heavy machines, or any type of vehicle that uses directional lighting. In some examples, load 150 include a first string of LEDs including a set of high-beam (HB) LEDs and a set of low-beam (LB) LEDs. In some cases, controller 112 may toggle between activating the set of LB LEDs, activating the set of HB LEDs, activating both the set of LB LEDs and the set of HB LEDs, and deactivating both the set of LB LEDs and the set of HB LEDs. load 150 may include any number of LEDs. For example, load 150 may include a number of LEDs within a range from 1 to 100 LEDs. In some examples, a high-light mode of load 150 may represent a mode in which the set of HB LEDs are activated. In some examples, a low-light mode of load 150 may represent a mode in which the set of HB LEDs are not activated.

It may be beneficial for system 100 to sink at least a portion of an overshoot electrical current through switching device 160. For example, an overshoot electrical current may cause switching device 160 to activate, causing an undesired electrical current 161 to flow through switching device 160 and allowing a desired electrical current 163 to flow through load 150. By activating switching device 160 in order to sink the undesired electrical current 161, system 100 may prevent the current flowing through load 150 from damaging load 150. In other words, switching device 160 may ensure that only the desired electrical current 163 flows through load 150, where the desired electrical current 163 does not damage the load 150.

Switching device 160 may in some cases, include a power switch such as, but not limited to, any type of field-effect transistor (FET) including any combination of a metal-oxide-semiconductor field-effect transistor (MOSFET), a bipolar junction transistors (BJT), an insulated-gate bipolar transistor (IGBT), a junction field effect transistors (JFET), a high electron mobility transistor (HEMT), or other elements that use voltage and/or current for control. Additionally, switching device 160 may include n-type transistors, p-type transistors, and power transistors, or any combination thereof. In some examples, switching device 160 includes vertical transistors, lateral transistors, and/or horizontal transistors. In some examples, switching device 160 include other analog devices such as diodes and/or thyristors. In some examples, switching device 160 may operate as switches and/or as analog devices. Switching device 160 may include various material compounds, such as Silicon, Silicon Carbide, Gallium Nitride, or any other combination of one or more semiconductor materials. In some examples, silicon carbide switches may experience lower switching power losses.

System 100 may control whether switching device 160 is activated based on an electrical current sensed by current sensor 162. In some examples, current sensor 162 may be implemented as a current sensing resistor, a capacitive or inductive current sensor or some other current sensing device. Driver circuit 170 may a current sensor signal that indicates a magnitude of the electrical current measured by current sensor 162.

Driver circuit 170 may include circuitry configured to amplify, filter, compare and perform other functions on electrical signals. In some examples, driver circuit 170 may receive control signal 171, e.g., from load controller 112, or some other processor not shown in the example of FIG. 1. The control signal may include information indicative of one or more thresholds for the current sensor signal from current sensor 162, as well as other operating parameters. For example, the control signal may include information indicative of a maximum current sensor signal value. Driver circuit 170 may control the switching device 160 to be turned on when a current sensor signal value is greater than the maximum current sensor signal value, e.g., satisfies an electrical current, or electrical voltage, overshoot trigger threshold. Driver 170 may control the switching device 160 to be turned off when the current sensor signal value does not satisfy the overshoot trigger threshold. In other words, in response to determining that the magnitude of electrical current satisfies the overshoot trigger threshold, driver circuit 170 may cause switching device 160 to turn on and redirect undesired electrical current through switching device 160. Said another way, when switching device 160 is turned ON, a first portion of the electrical current 159 from power converter 120 is split into undesired electrical current 161 through switching device 160 and desired electrical current 163, which continues to flow through load 150. In this manner, when load 150 switches from a higher operating current mode, e.g., a high-light mode to a lower operating current mode, e.g., a low-light mode, or a sleep mode in the example of load 150 being a processing circuitry, system 100 may detect a potential overshoot and protect load 150.

In the example of FIG. 1, current sensor 162 is located to sense current 163 that flows through load 150. In other examples, system 100 may include other current sensors (not shown in FIG. 1) that may be configured to configured to generate an electrical signal to indicate a magnitude of the electrical current through other branches of the circuitry of system 100.

In some examples, the control signal received by driver circuit 170 may include information indicative of a lower-bound current sensor signal value and an upper-bound current sensor signal. The lower-bound current sensor signal value and an upper-bound current sensor signal may define a range for an overshoot trigger threshold. Driver circuit 170 may cause switching device 160 to turn on and to turn off based on the overshoot trigger thresholds e.g., driver circuit 170 may generate the amplifier signal in order to turn off switching device 160 when the current sensor signal decreases to the lower-bound current sensor signal value. The ON and OFF switching activity may define a pattern of square wave pulses.

In other words, if the current sensor signal increases past a baseline value, indicating a current overshoot to load 150, driver circuit 170 may generate a compensation signal to the compensation node, comp 122 of power converter 120 to maintain the current sensor signal between the lower-bound current sensor signal value and the upper-bound current sensor signal value. In the example of system 100, the compensation signal at comp 122 may control a duty cycle of the one or more switching devices of power converter 120. The compensation signal may in some examples, define on/off switching of one or more switching devices of power converter 120, thereby causing power converter 120 to deliver the desired amount of electrical current to load 150. Increasing the duty cycle of the one or more switching devices may increase the electrical current delivered to load 150. Decreasing the duty cycle of the one or more switching devices may decrease the electrical current delivered to load 150.

Although shown as an external terminal for power converter 120 in the example of FIG. 1, in various examples, comp 122 may be implemented as either an internal or external compensation node for power converter 120. Comp 122 may be used to compensation the loop as a frequency response and may act as a decision node for the duty cycle for power converter 120. A higher voltage present at comp 122 may cause a higher duty cycle for power converter 120 and higher conversion ratio. When comp 122 is exposed to relatively lower voltages, than power converter 120 may reduce the duty cycle. In some examples, the terminal at comp 122 may be tied to a capacitor (not shown in FIG. 1) and comp 122 may be exposed to current. Adding extra discharge current to comp 122 may cause power converter 120 to reach lower duty cycles more quickly, when compared to adding no extra discharge current, in the example of load 150 switching from a higher power mode to a lower power mode. Reaching lower duty cycles may result in power converter 120 outputting less current 159.

A current overshoot may occur when controller 112 outputs a control signal in order to short a path across a first set of LEDs of load 150, causing the first set of LEDs to turn off while a second set of LEDs of load 150 remain turned on. By shorting the path across the first set of LEDs, controller 112 may remove the first set of LEDs from an electrical pathway between power converter 120 and ground. Shorting the path across the first set of LEDs may decrease a resistance of load 150, thus increasing the magnitude of electrical current 159 output from power converter 120 and/or capacitor 130. Current sensor 162 may detect the current overshoot by detecting the increase in electrical current 159, and driver circuit 170 may activate switching device 160 to sink the undesired electrical current 161, which may prevent load 150 from being damaged. In some examples, controller 112 may short a path across the first set of LEDs of load 150 in response to receiving an instruction to toggle load 150 from a high beam mode to a low beam mode.

The circuitry of this disclosure may have advantages when compared to other forms of circuitry. For example, adding the additional discharge current to comp 122 based on the circuit response to load changes may reduce response time (e.g., speed up the response), which may reduce the duration the circuitry adjusts to a load transition.

The circuit operation may improve the system efficiency, such as by reducing or eliminating charge/discharge cycles that are not needed as well as may improve overall current regulation accuracy, minimizing periods of time in which the system is above the target regulation current.

Figure 2:
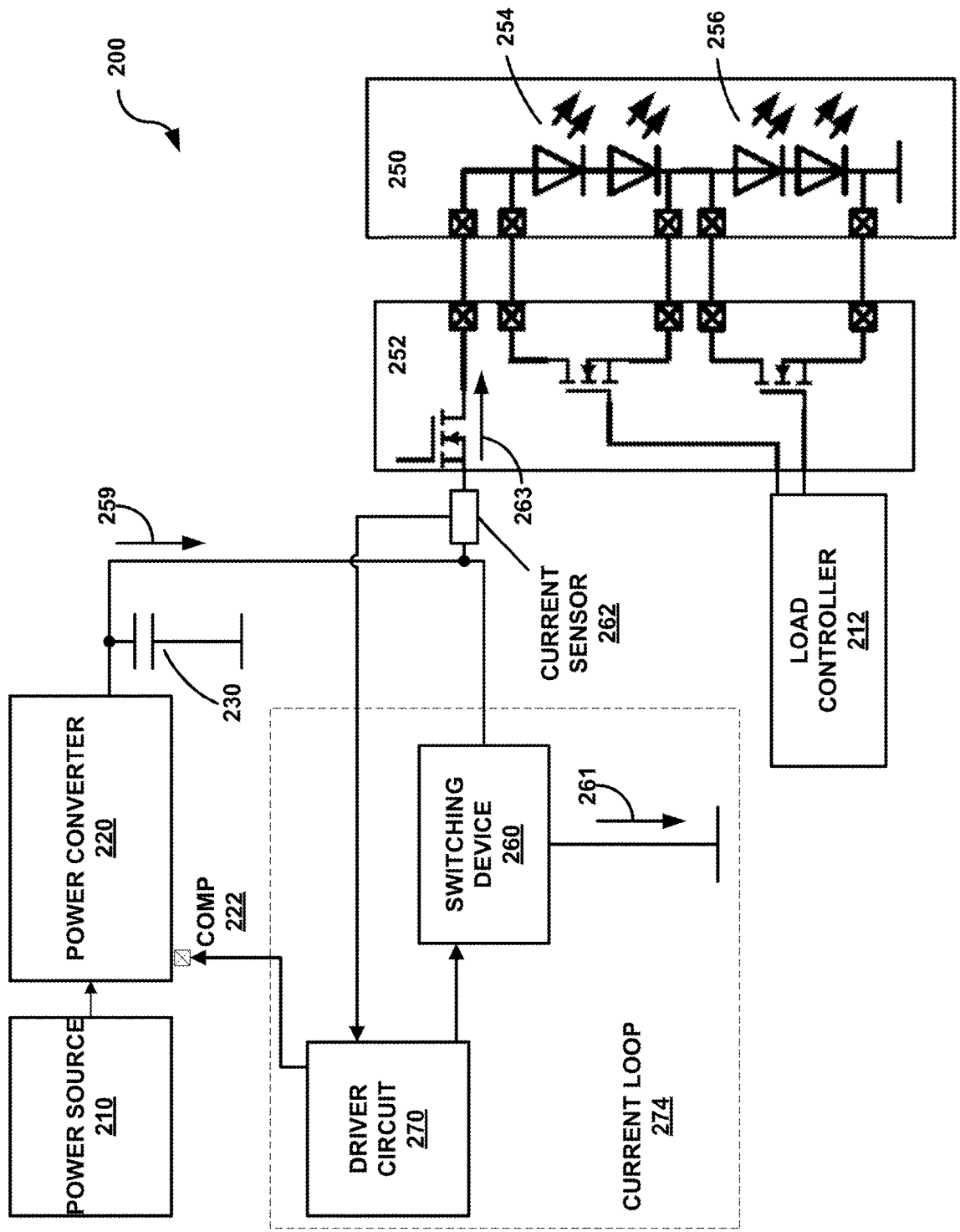
FIG. 2 is a block and schematic diagram illustrating an example circuit configured to control electrical current overshoot, according to one or more techniques of this disclosure.

FIG. 2 is a block and schematic diagram illustrating an example circuit configured to control electrical current overshoot, according to one or more techniques of this disclosure. System 200 is an example implementation of system 100 described above in relation to FIG. 1 and has the same or similar functions and characteristics. The description of system 200 applies equally to system 100. In the example of FIG. 2, system 200 includes power source 210 that supplies power converter 220. Power converter 220 includes a compensation terminal, comp 222, which operates the same as comp 122 described above in relation to FIG. 1. System 200 also includes current loop 274, which includes driver circuit 270 and switching device 260 as well as receiving an input signal from current sensor 262 and outputs the compensation current to comp 222. Current loop 274 is an example of the feedback loop described above in relation to FIG. 1 and may measure output current 259 and add overshoot protection for the load. Output capacitor 230 performs the same function as capacitor 130 of system 100.

Load controller 212 may control the operation of the load, which is a set of LEDs in the example of system 200. Load controller may activate or bypass one or more LEDs 250 by controlling the operation of switches 252. In some examples, activating all of LEDs 250, e.g., LEDs 254 and 256 may consume more power, e.g., draw more current, than bypassing either or both of LEDs 254 and 256.

The overshoot protection features for driver circuit 270, which are the same as for driver circuit 170 of FIG. 1, may prevent the overshoot of the supplied power from damaging the load of LEDs 250, e.g., during a change in lighting mode. As noted above, the overshoot protection for driver circuit 270 may cause switching device 260 to turn ON and to turn OFF based on the overshoot trigger threshold, and the switching behavior of switching device 260 may define a pattern of square wave pulses.

For circuit stability, power converter 220 of FIG. 2, as with power converter 120 of FIG. 1, may respond more slowly to reduce power supplied to the load, compared to the response time of driver circuit 270 or 170. Therefore, during some load reductions, such as the first lighting mode to the second lighting mode, the slower response from power converter 220 may continue to deliver more power than needed during the transition, which may result in undesirable circuit behavior, such as oscillation in the output current 259 and the desired current.

Driver circuit 270 may also include a circuit to apply an additional auto-adjustable discharge current to the compensation terminal, comp 222, of power converter 220, which may cause the power to the load to reach a new steady state condition more quickly without speeding up the response time of power converter 220. Maintaining the slower response time from power converter 220, compared to the response time of driver circuit 270, may maintain the stable response time of the feedback loop for the power converter.

This discharge current circuitry of driver circuit 270 may generate and deliver the additional auto-adjustable discharge current to the compensation terminal, comp 222, separate from electrical current 159 generated by power converter 120. That is, the discharge current to comp 222 may separately generated and not part of output current 259, the desired current or undesired current 261.

Figure 3A:
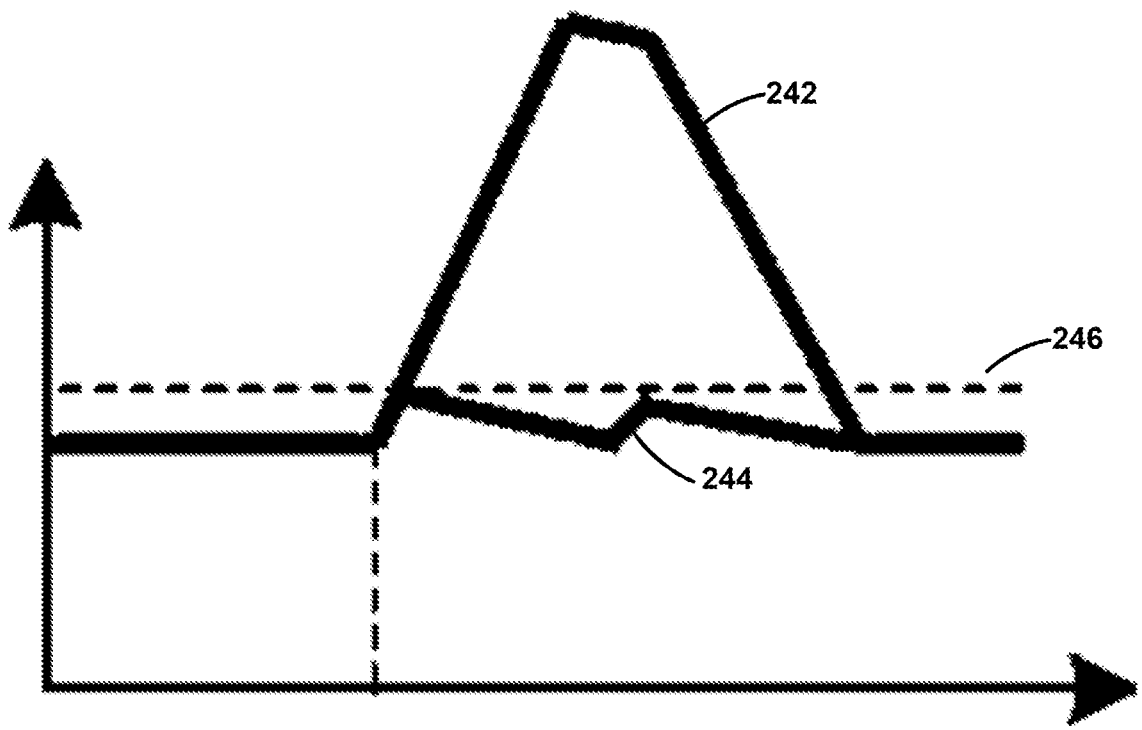
FIGS. 3A and 3B are timing graphs illustrating an example operation of the overshoot protection loop circuit of this disclosure.
Figure 3B:
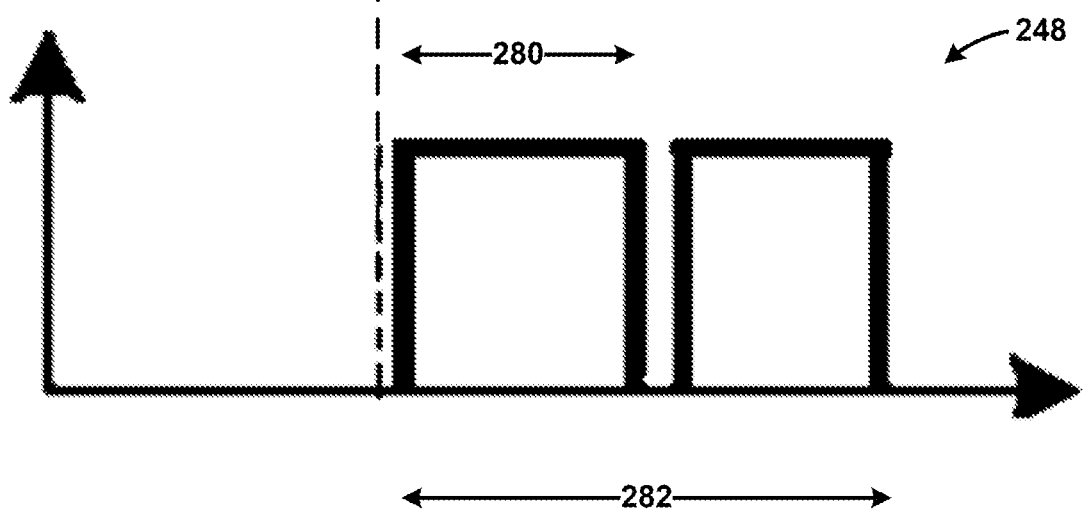

FIGS. 3A and 3B are timing graphs illustrating an example operation of the overshoot protection loop circuit of this disclosure. FIG. 3B. illustrates the pattern of square wave pulses 248 from the ON and OFF switching of the switching device, e.g., switching device 160 and 260 of FIGS. 1 and 2, to reduce overshoot 242 of FIG. 3A. In some examples, reducing overshoot 242 may keep the desired current 244 less than current limit 246.

The pattern may change based on the type of load, the power mode that load 150 of FIG. 1 is switching from and switching to, and other factors. For example, a large power change, e.g., from all the LEDs 250 of FIG. 2 switched ON, to only a few LEDs switched ON, may result in a one type of square wave pattern, while relatively small power change, may result in a different square wave pattern. Some characteristics of the pattern of square wave pulses may include a pulse density, and a duration 280 of one or more square wave pulses in the pattern of square wave pulses. Duration 280 of the square wave pulse is the duration that switching device 160 is turned on. Longer ON time for switching device 160 results in a characteristic longer duration pulse for one or more of the pulses in the pattern of square wave pulses.

The pulse density may also be described as a "pulse frequency" in this disclosure. Relatively more pulses per period of time, e.g., pulses per second, may be described as a higher pulse density, or pulse frequency, than relatively fewer pulses per period of time 282. The circuitry of driver circuit 270 may adjust the magnitude of the adjustable discharge current delivered to the compensation terminal, comp 222, based on both the duration of square wave pulses and on the pulse density.

Figure 4:
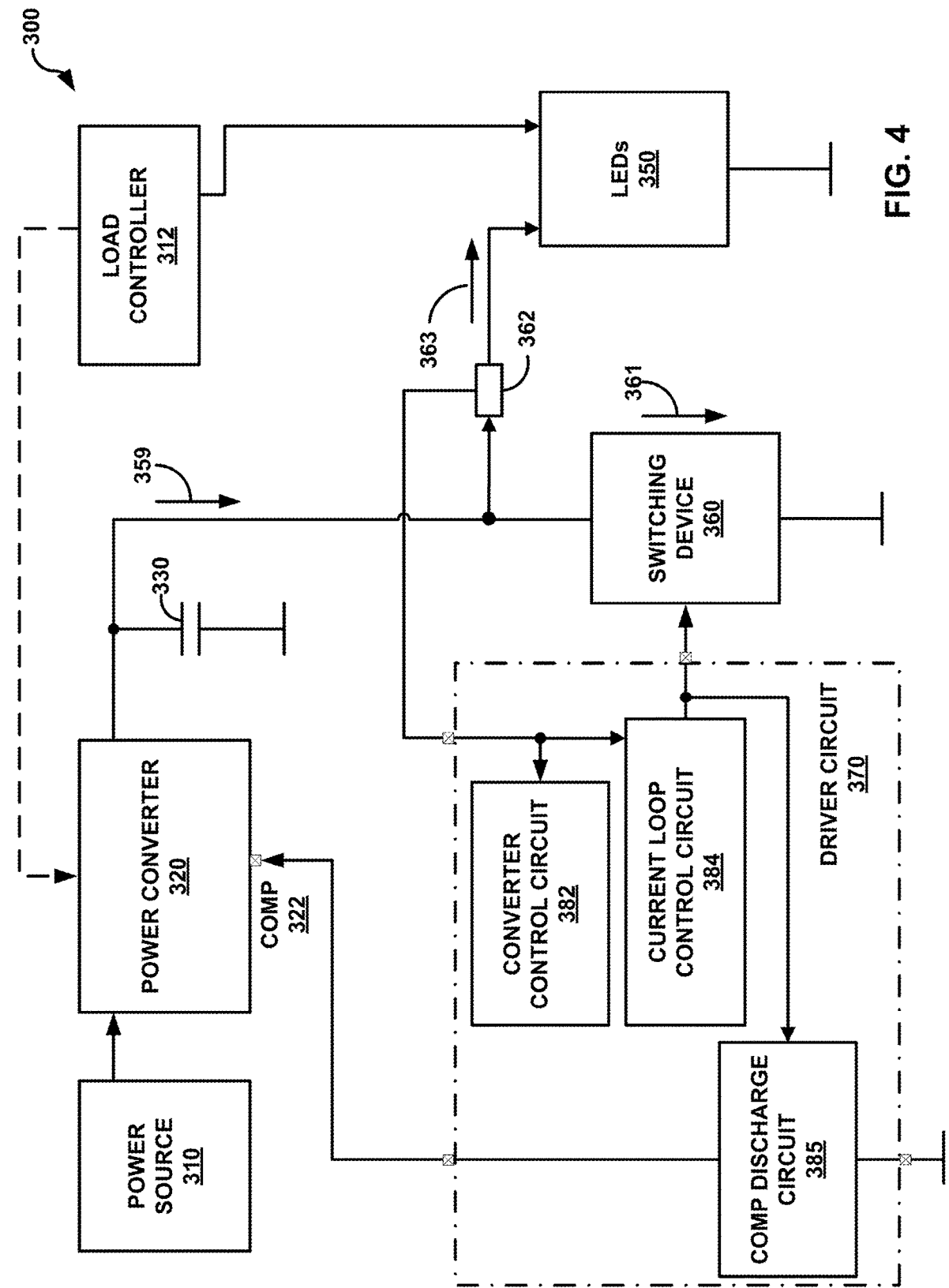
FIG. 4 is a block diagram illustrating and example implementation of a driver circuit for a system configured to control power delivered to a load according to one or more techniques of this disclosure.

FIG. 4 is a block diagram illustrating and example implementation of a driver circuit for a system configured to control power delivered to a load according to one or more techniques of this disclosure. System 300 in the example of FIG. 4 is an example implementation of systems 100 and 200 described above in relation to FIGS. 1 and 2 and has the same or similar functions and characteristics. The description of system 300 applies equally to systems 100 and 200. In the example of FIG. 4, system 300 includes power source 310 that supplies power converter 320. Power converter 320 includes a compensation terminal, comp 322, which operates the same as comp 122 described above in relation to FIG. 1. System 300 includes a feedback loop and an example implementation of driver circuit 370, which is an example of the feedback loop described above in relation to FIG. 1. Output capacitor 330 performs the same function as capacitor 130 of system 100. The load of system 300 is LEDs 350, which may be controlled by load controller 312 as described above in relation to FIGS. 1 and 2.

Example driver circuit 370 includes a converter control circuit 382, current loop control circuit 384 and comp discharge circuit 385. Driver circuit 370 may have more or fewer components than illustrated in the example of FIG. 4. Current loop control circuit 384 may prevent overshoot to a load during load level transitions. In the example of FIG. 3A, current loop control circuit 384 may prevent or reduce current overshoot 242 to maintain the load current (desired current) 244. Current loop control circuit 384 may control switching device 360 to automatically to sink current from output capacitor 330 and avoid the current spikes to the LED chain caused by a load jump, e.g., a change in operating mode resulting in a change in power consumed. Current loop control circuit 384 may autonomously stop sinking undesired current 361 after ones the extra current from power converter 320 reduces below a limit.

Comp discharge circuit 385 may deliver an auto adjustable discharge current to the compensation terminal, comp 322 of power converter 320 as described above in relation to FIGS. 1-3B. As noted above, the adjustable discharge current may be separate from output electrical current 359 generated by power converter 320, as well as separate from desired current 363 and undesired current 361. As with current sensor 162 and 262 described above in relation to FIGS. 1 and 2, current sensor 362 is located to sense load current 363 generate an electrical signal to indicate a magnitude of the load current.

Figure 5A:
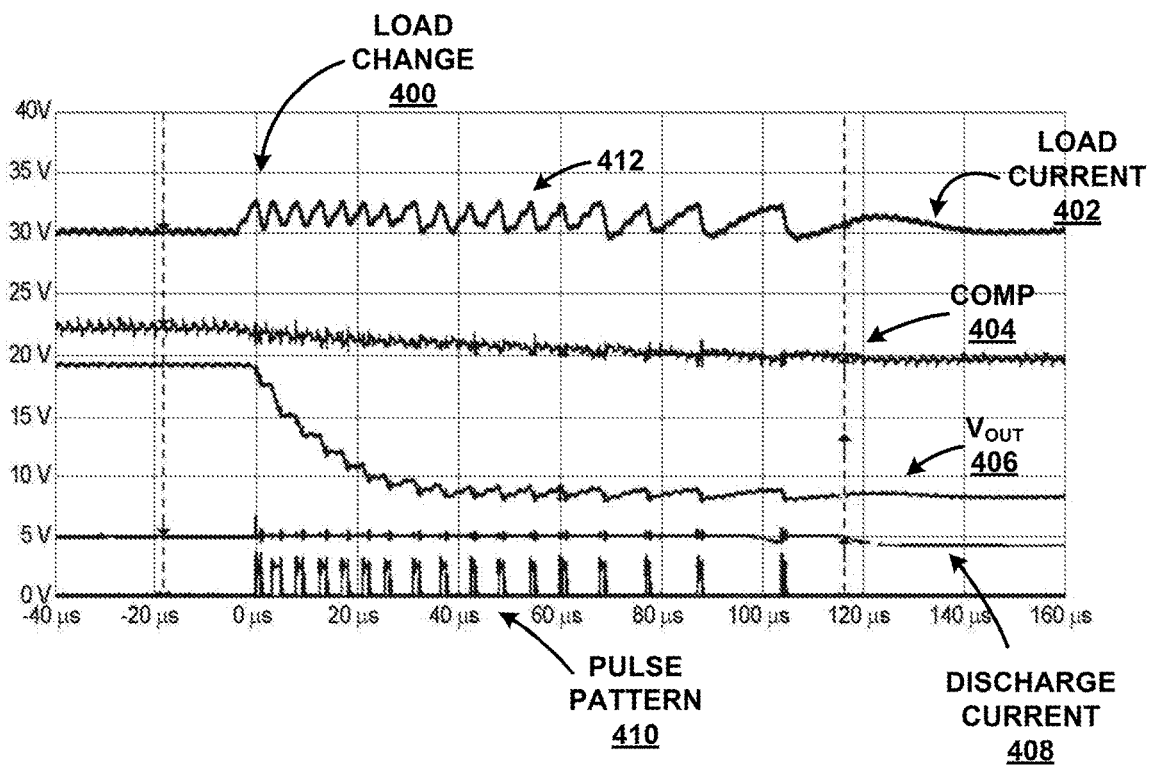
FIGS. 5A and 5B are timing diagrams illustrating example operation of the circuits configured to control power to a load according to one or more techniques of this disclosure.
Figure 5B:
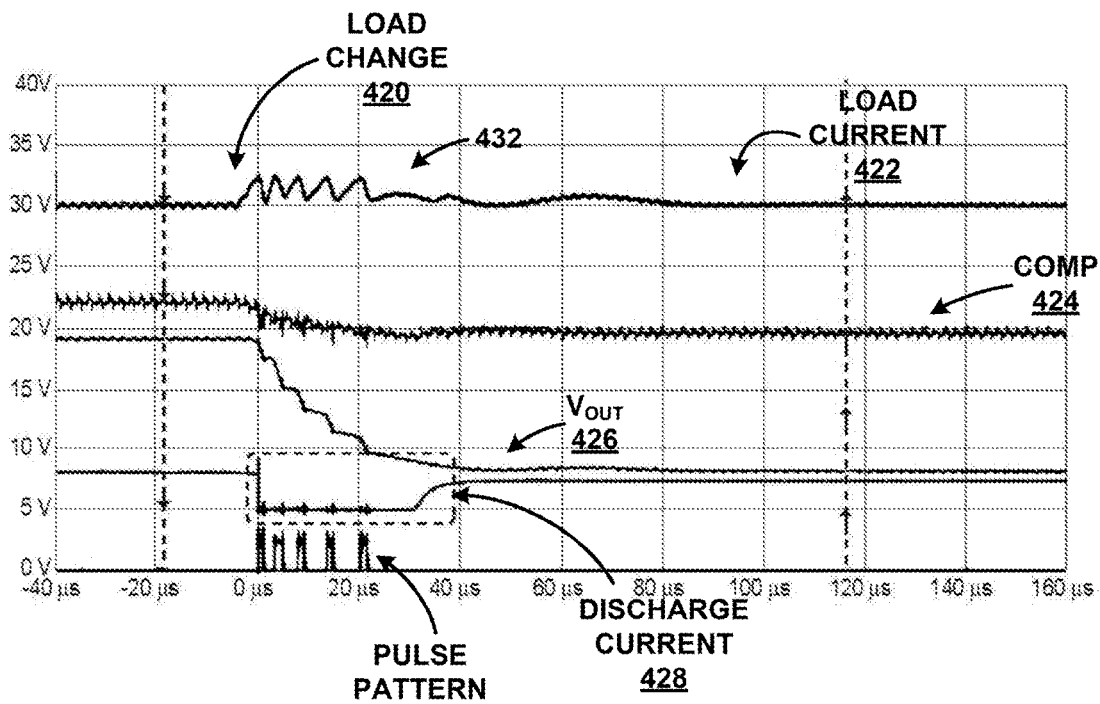

FIGS. 5A and 5B are timing diagrams illustrating example operation of the circuits configured to control power to a load according to one or more techniques of this disclosure. FIGS. 5A and 5B will be described in terms of system 300 described above in relation to FIG. 4. Systems 100 and 200 depicted in FIGS. 1 and 2 operate in a similar manner.

FIG. 5A depicts the operation of system 300 without the use of comp discharge circuit 385, e.g., with comp discharge circuit 385 removed or inactive. In other words, driver circuit 370 does not apply the additional auto adjustable discharge current 408 to comp 322. While in transition from load change 400, e.g., bypassing one or more LEDs to operate in a lower light mode, or some other type of load moving to some other lower power consumption mode, the overshoot protection circuitry of driver circuit 370, which may include current loop control circuit 384, may operate switching device 360 to avoid current spikes to LEDs 350. The overshoot protection may generate a detectable square wave pulse pattern 410 and oscillations 412, but avoids current overshoot, such as overshoot 242 described above in relation to FIG. 3A. During the transition output voltage Vout 406 may decrease, and driver circuit 370 may apply a compensation current, comp 404, to the compensation terminal of power converter 320, as described above in relation to FIGS. 1-3B.

FIG. 5B depicts the performance of system 300 for the same load change 420, but with the added discharge current 428 applied based on the duration and pulse density of the square wave pulse pattern 430. The added discharge current 428 applied to comp 322 by comp discharge circuit 385 results in fewer oscillations 432. Load current 422 transitions to a steady state faster than load current 402.

Figure 6:
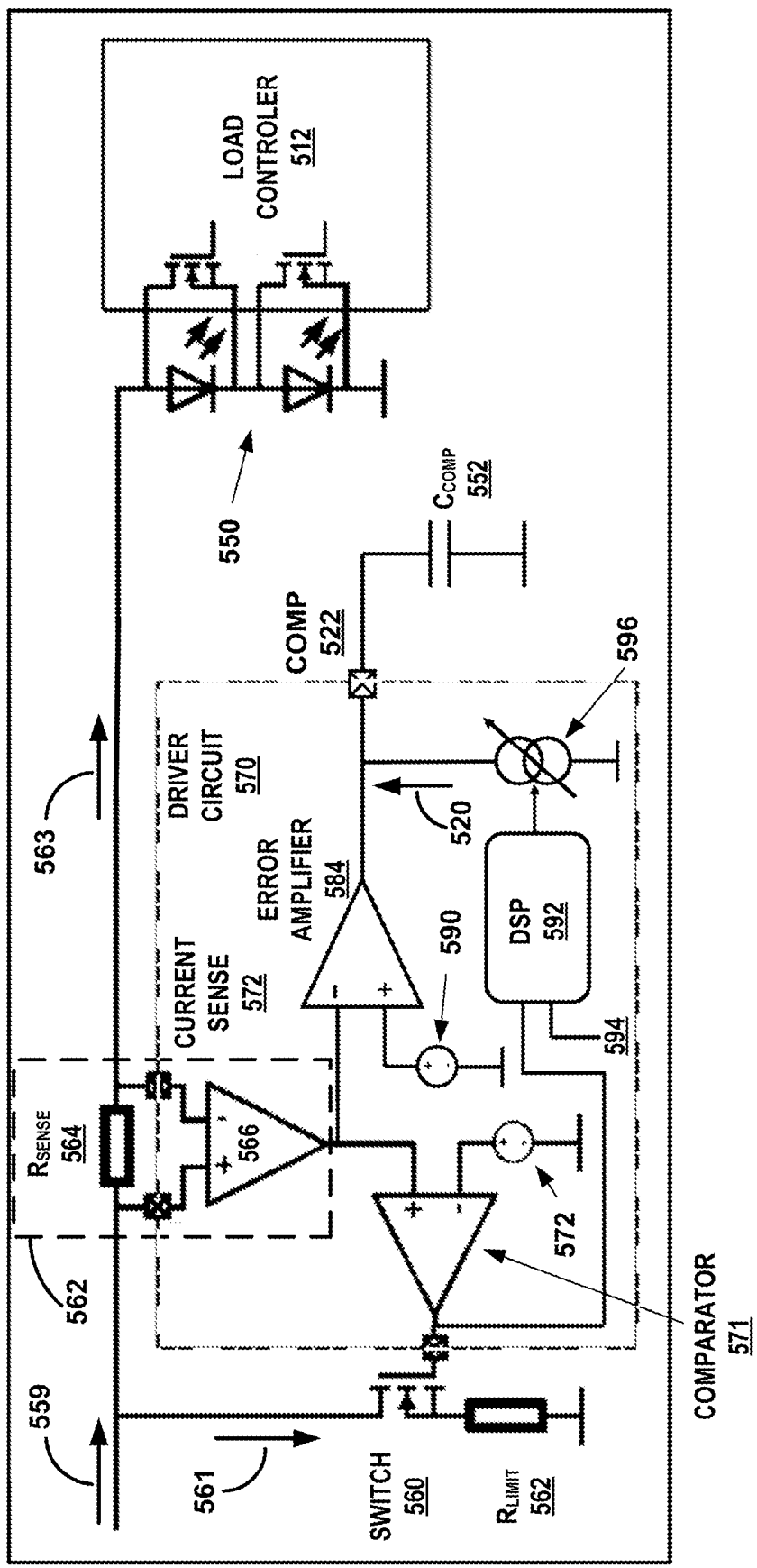
FIG. 6 is a schematic diagram illustrating an example implementation of a driver circuit of this disclosure.

FIG. 6 is a schematic diagram illustrating an example implementation of a driver circuit of this disclosure. Driver circuit 570 is an example of driver circuits 170, 270 and 370 described above in relation to FIGS. 1, 2 and 3. Therefore driver circuit 570 may be configured to control power to a set of LEDs 550 by controlling a switching device 560 and controlling a power converter (not shown in FIG. 6) in accordance with one or more techniques of this disclosure. In the example of FIG. 6 the circuit includes LEDs 550, current sensor 562, and comparator 571. Load controller 512 may control the operation, e.g., lighting modes, of LEDs 550. Current sensor 562 includes current sensing resistor 564 and current sensing amplifier 566. Reference 572 may set a threshold for operating switch 560 to sink undesired current 561 through resistor Rlimit 562. Switching device 560 may be an example of switching device 160 of FIG. 1. Current sensor 562 may be an example of current sensor 162 of FIG. 1.

In the example of FIG. 6, switching device 560, current sensor 562, comparator 571, and reference 572 may be configured to split output current 559 so that undesired electrical current 561 flows through switching device 560. The remaining portion of output current 559 may flow to the load, LEDs 550 as desired electrical current 563 which current sensor 562 senses in the example of FIG. 6. Comparator 571 compares compare the magnitude of the load current, e.g., desired current 563, the overshoot trigger threshold 572.

Error amplifier 584 also receives the output of current sensor 562, compares the indication of the current to a threshold value 590 to apply compensation to the comp 522 terminal as described above in relation to FIGS. 1-5. Comp 522 connects to the compensation terminal of the power converter (not shown in FIG. 6). The example of FIG. 6 illustrates compensation capacitor Ccomp 552, described above in relation to FIG. 1 connected between comp 522 and ground.

In the example of FIG. 6, the comp discharge circuit, e.g., comp discharge circuit 385 described above in relation to FIG. 4, is implemented processing circuitry, digital signal processor 592, that controls current source 596. DSP 592 may receive a threshold value 594 as well as the same trigger signal at the output of comparator 571 as for the overshoot control circuitry, e.g., the control terminal for switch 560. In this manner DSP 592 may monitor and respond to the pulse duration and pulse density of the ON times for switch 560. DSP 592 may control the auto adjustable discharge current 520 to comp 522, as described above in relation to FIG. 5B. Though the example of FIG. 6 depicts DSP 592 as controlling the discharge current, other controller circuits may also perform the function to control the added current. The controller circuits may be implemented using other types of digital circuitry, as logic circuitry, or may be analog circuitry.

Figure 7A:
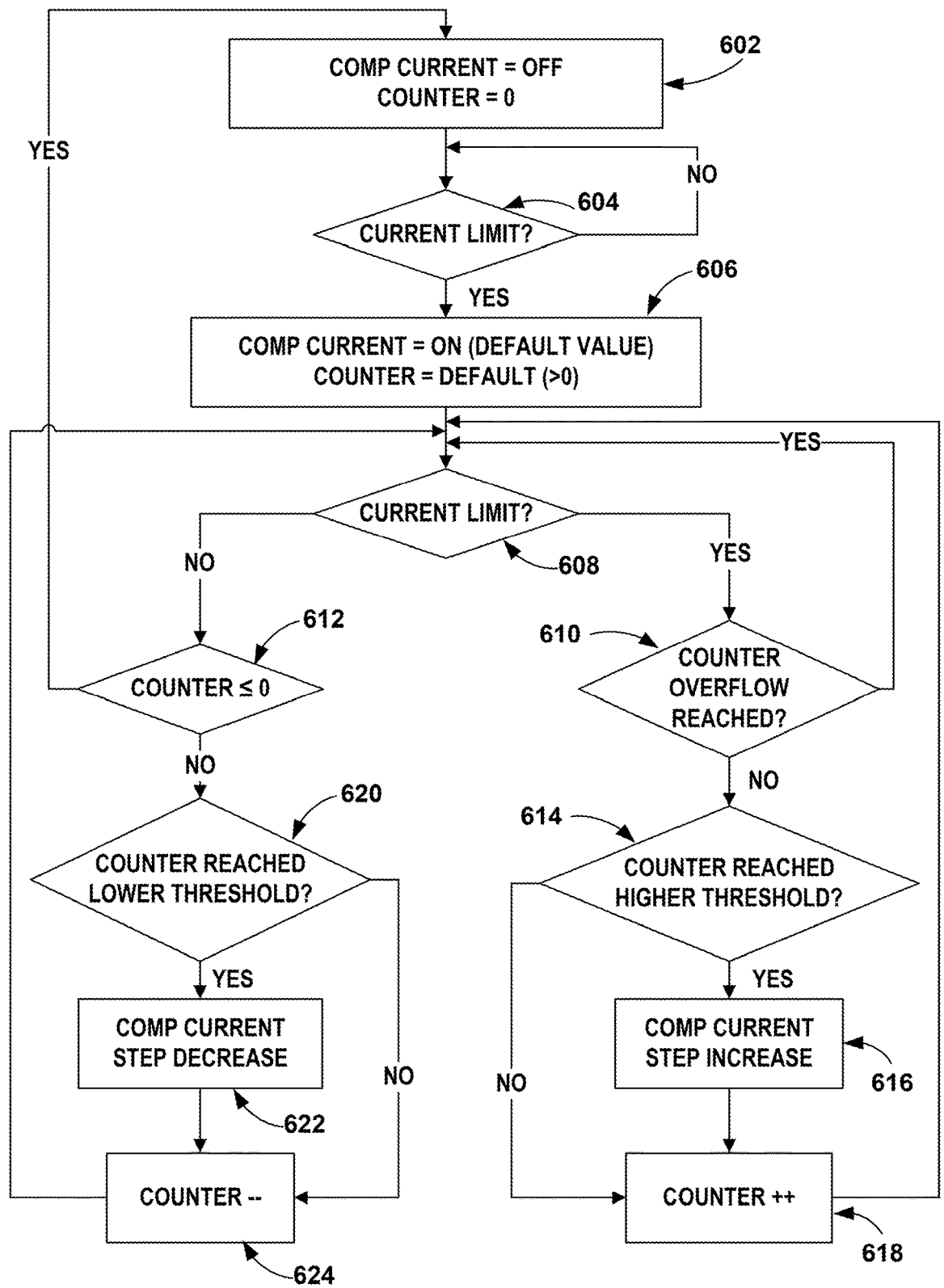
FIG. 7A is a flow diagram illustrating an example operation of the auto-adjustable discharge current circuit according to one or more techniques of this disclosure.

FIG. 7A is a flow diagram illustrating an example operation of the auto-adjustable discharge current circuit according to one or more techniques of this disclosure. The example of FIG. 7A is just one possible implementation of a process to apply an auto-adjustable additional discharge current to the compensation node of a power converter, e.g., comp terminal 122 of power converter 120 described above in relation to FIG. 1.

The discharge current magnitude may be based on the pulse pattern characteristics, e.g., pulse duration and density, of the overshoot protection circuitry of the driver circuit, e.g., driver circuit 170 of this disclosure. The steps of FIG. 7A may be implemented by DSP 592, of FIG. 6, or by other similar processing circuitry.

Figure 7B:
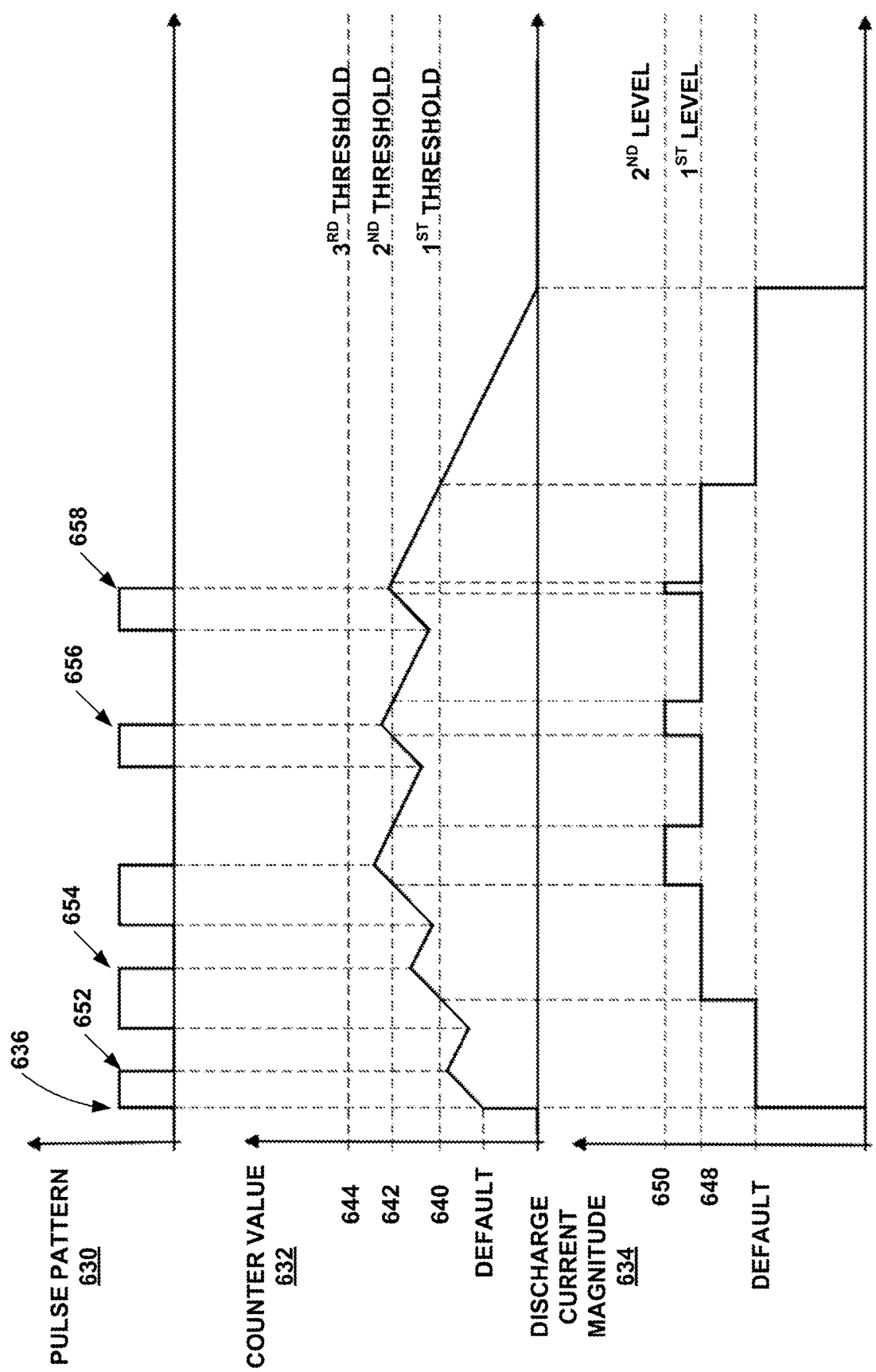
FIG. 7B is a timing chart illustrating an example operation of the auto-adjustable discharge current circuit according to one or more techniques of this disclosure.

FIG. 7B is a timing chart illustrating an example operation of the auto-adjustable discharge current circuit according to one or more techniques of this disclosure. The example of FIG. 7B corresponds to and example operation of a driver circuit configured to operate according to the example flow chart of FIG. 7A and the steps of FIG. 7A will be described using the example of FIG. 7B.

After a load change 636, the driver circuit of this disclosure may operate the switch to manage a possible current overshoot to the load, e.g., split the output current into desirable and undesirable current. The driver circuit may also set the compensation current, e.g., from source 596 or some other circuitry, to be initially OFF and set a counter to zero (602). The load change 636 may cause the load current to exceed an overshoot trigger threshold (YES branch of 604) and trigger the comp discharge circuitry of the driver circuit to apply the adjustable discharge current to the comp terminal (606), as shown in FIG. 5B above. In some examples, the counter may be set to a default value greater than zero to set a start time.

When the magnitude of the electrical current continues to satisfy the overshoot trigger threshold subsequent to the start time (YES branch of 608), the driver circuit may check if the counter reached a counter overflow (610). If yes, the driver circuit may recheck the indication of the current from the current sensor compared to the current limit, e.g., to the overshoot protection threshold (YES branch of 610). If no, the driver circuit checks the counter value against a counter threshold, e.g., the first threshold 640, second threshold 642, third threshold 644 for counter value 632 in FIG. 7B. When the counter reaches one of the higher thresholds (YES branch of 614) the driver circuit may increase the discharge current magnitude (616), e.g., from a default current magnitude to a first level 648 or to a second level 650 as shown in FIG. 7B. Within the first pulse 652 of FIG. 7B, the driver circuit continues to increment the counter (618) above the default counter value 632 but less than the first counter threshold 640. In other words, the driver circuit is configured to deliver the adjustable discharge current to the compensation terminal at the default current level subsequent to the beginning 636 of the first pulse 652.

At the time from the end of the first pulse 652 and to the beginning of the second pulse 654, the sensed load current may not satisfy the overshoot protection threshold (NO branch of (608). The driver circuit may verify that the counter is still greater than or equal to zero (612) and check the counter against a counter threshold (620). The counter is above the default counter value (NO branch of 620), therefore during the time before the second pulse 654, the driver circuit may decrement the counter (624) and recheck the sensed current compared to the current limit (608).

Within the second pulse 654, the sensed current satisfies the overshoot protection threshold (YES branch of 608) and the switch conducting the undesired current is ON. Because of the duration of second pulse 654, the driver circuity may continue to increment the counter (618), which eventually satisfies the first counter threshold 640. In other words, in response to determining that the magnitude of the electrical current continues to satisfy the overshoot trigger threshold at a second time subsequent to the first time, the driver circuit is further configured to change (616) the adjustable discharge current to the first current level 648, which is different from, and higher than the default current level.

The driver circuit may continue to execute the flow chart of FIG. 7A. As the pulse density for the pulses and pulse duration of the individual pulses decrease, e.g., for pulses 656 and 658, the driver circuit may decrement the counter (624) more than increment the counter (618). When the counter value reaches a lower counter threshold (YES branch of 620), e.g., after pulse 656, the driver circuit may decrease the magnitude of the comp current (622). In the example of FIG. 7B, the driver circuit steps down the current from second level 650 to first level 648, then to the default level of discharge current. In other words, in response to determining that the magnitude of the electrical current, e.g., the output electrical current or the desired electrical current, fails to satisfy the overshoot trigger threshold (NO branch of 608) at a second time subsequent to the first time, the driver circuit is configured to change the adjustable discharge current to a different, lower current level (622).

After pulse 658, the driver circuit may continue to decrement the counter (624). When the driver circuit determines the counter is less than or equal to zero (YES branch of 612), the driver circuit is further configured to turn off the adjustable discharge current (602).

Figure 8A:
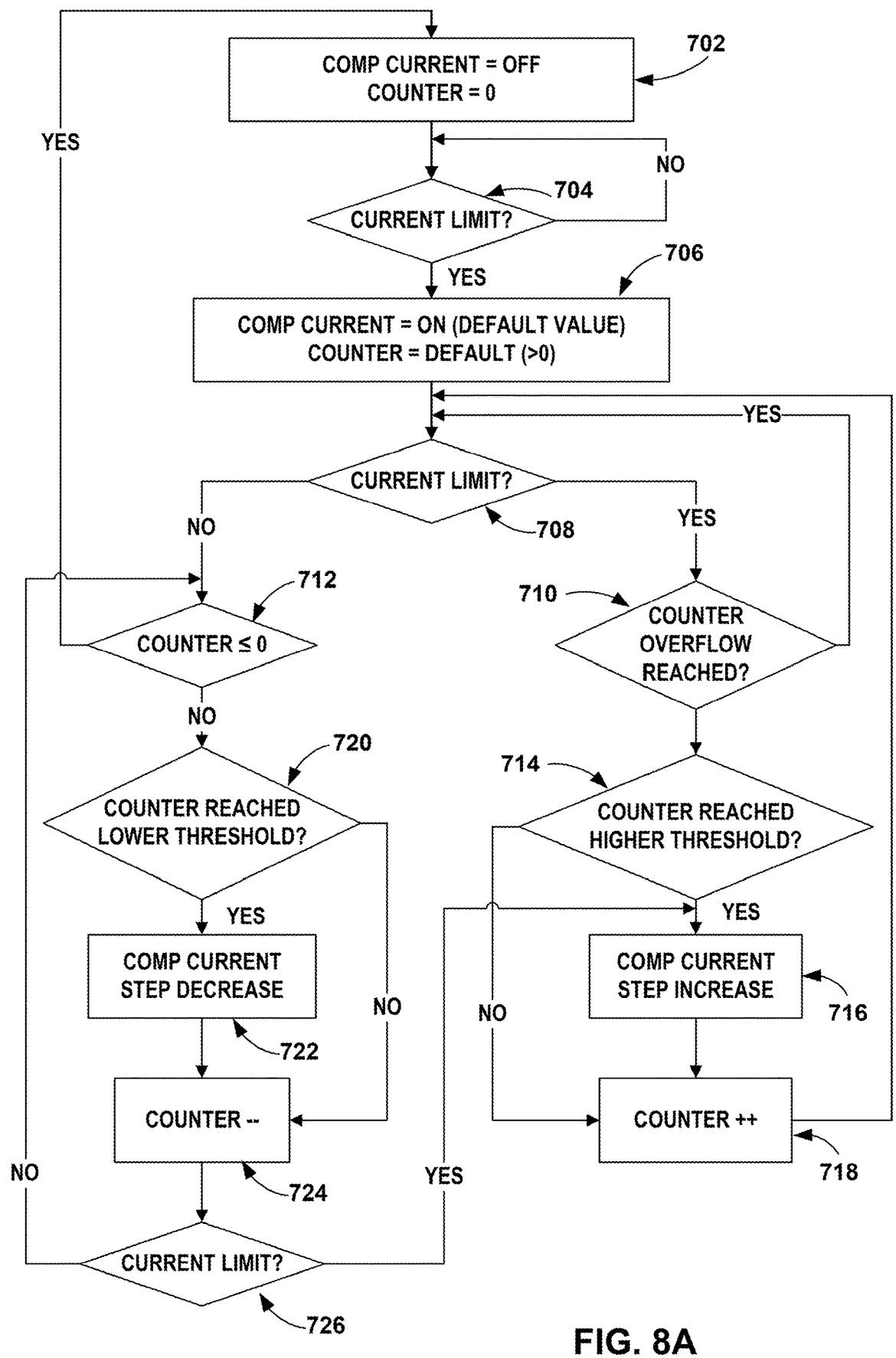
FIG. 8A is a flow diagram illustrating a second example operation of the auto-adjustable discharge current circuit according to one or more techniques of this disclosure.

FIG. 8A is a flow diagram illustrating a second example operation of the auto-adjustable discharge current circuit according to one or more techniques of this disclosure. As described above in relation to FIG. 7A, the example of FIG. 8A is another possible implementation of a process to apply an auto-adjustable additional discharge current to the compensation node of a power converter. The technique defined by the flow chart of FIG. 8A may result in a different circuit response compared to the time charts shown in the example of FIG. 7B.

After a load change, any of the driver circuits described herein may compare the magnitude of electrical current to an overshoot trigger threshold (704). In response to determining that the electrical current satisfies the overshoot trigger threshold, cause the switching device to turn on and redirect undesired electrical current through the switching device to protect the load. The driver circuit may also generate deliver an adjustable discharge current to the compensation terminal of the power converter (706).

When the sensed current continues to satisfy the overshoot trigger threshold, (YES of 708), the driver circuit may compare the counter value to a counter overflow (710). When the sensed current fails to satisfy the overshoot trigger threshold (NO branch of 708), the driver circuit may check whether the counter value is less than or equal to zero (712).

As described above in relation to FIGS. 7A and 7B, while the sensed current continues to satisfy the overshoot trigger threshold, and after checking counter overflow (710), the driver circuit may compare the counter to a counter threshold (714). For a time period in which the counter has not exceeded the next counter threshold (NO branch of 714), the driver circuit may increment the counter (716) and compare the sensed current to the current threshold (708). For a time period in which the counter satisfies, e.g., exceeds one of the counter thresholds (YES branch of 714), the driver circuit may increase the compensation current to a next current step, e.g., a higher current magnitude step (716).

For periods of time in which the sensed current fails to satisfy the overshoot trigger threshold (NO branch of 708), and after the counter "zero check" (712), the driver circuit may also compare the counter to the same counter thresholds (720). If the counter value is below the most recent counter threshold (YES branch of 720), the driver circuit may decrease the compensation current to the next lower current magnitude step (722). Thus, while the sensed current fails to satisfy the overshoot trigger threshold, the driver circuit may cause the switch to be OFF and may decrement the counter (724). In other words, the driver circuit may check the counter against the counter threshold and decrease the applied discharge current based on the comparison.

After decrementing the counter (724), the driver circuit may again compare the sensed electrical current to the overshoot trigger threshold. In some examples, the driver circuit may compare the sensed current at 726 to a different current threshold from that in 708. For cycles during which the current limit is greater than the overshoot trigger threshold (YES branch of 726), the driver circuit may increase the discharge current magnitude to the next current step (716) and increment the counter (718). For cycles during which the current fails to satisfy the threshold, the driver circuit may perform the counter zero check (712).

In other words, in contrast to the approach in the example of FIG. 7A, for the example of FIG. 8A, the driver circuit may take a two-step approach when the current fails to satisfy the overshoot trigger threshold (NO branch of 708). That is, at some point in time the current fails to satisfy the overshoot trigger threshold and the driver circuity may decrement the counter (724), and in some examples also decrease the comp current (722), e.g., step one. At a subsequent time, the driver circuit may determine that the load current satisfies the overshoot trigger threshold (YES branch of 726), and the driver circuit may next increase the current (716) and increment the counter (718), e.g., step two.

Figure 8B:
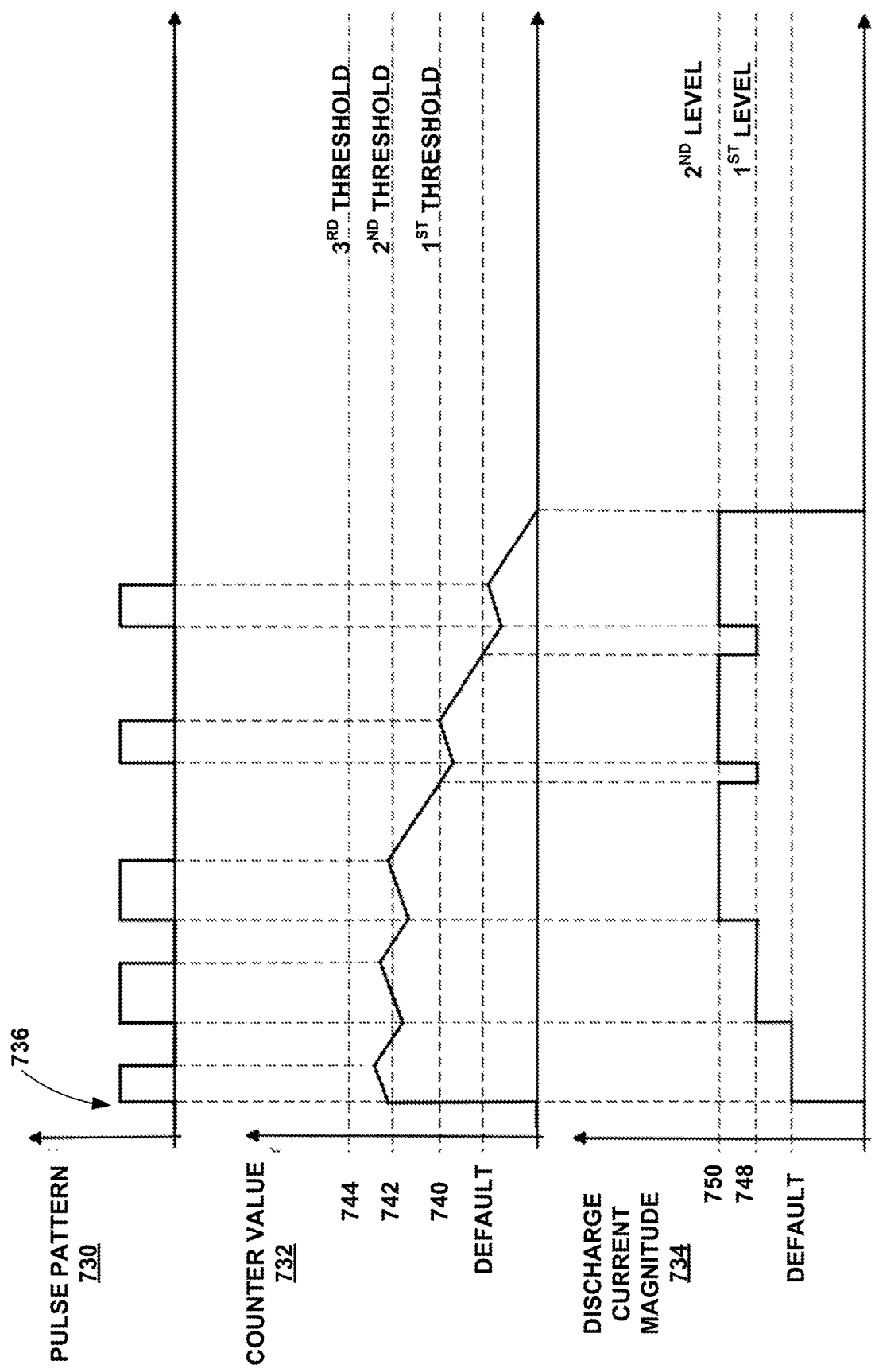
FIG. 8B is a timing chart illustrating an example operation of the auto-adjustable discharge current circuit according to one or more techniques of this disclosure.

FIG. 8B is a timing chart illustrating an example operation of the auto-adjustable discharge current circuit according to one or more techniques of this disclosure. FIG. 8B illustrates the same pulse pattern 730 as pulse pattern 630 depicted in FIG. 7B. The circuit response for driver circuit executing the steps of FIG. 8A, for the same pulse pattern 730 may increment the applied discharge current from the default to the $1^{st}$ current level 748 and second current level 750 in less time than for FIG. 7B. The initial default value for the counter after the load transition 736, in the example of FIG. 8B is set to be at least the second counter threshold 742. The driver circuit may increment and decrement the counter based on pulse pattern 730, and apply discharge current based on a comparison to first threshold 740, second threshold 742 and third threshold 744.

In one or more examples, the functions described above may be implemented in hardware, software, firmware, or any combination thereof. For example, the various components of FIG. 5 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described The techniques of this disclosure may also be described in the following clauses.

Clause 1: A circuit configured to control power delivered to a load comprising a power converter comprising a compensation terminal, wherein the power converter is configured to generate an output electrical current, wherein at least a portion of the output electrical current flows through the load; a switching device; a sensor configured to generate an electrical signal to indicate a magnitude of the electrical current through the load; and a driver circuit configured to protect the load from overshoot of the electrical current, wherein to protect from overshoot of the electrical current, the driver circuit is configured to: compare the magnitude of the electrical current through the load to an overshoot trigger threshold; in response to determining that the magnitude of the electrical current through the load satisfies the overshoot trigger threshold, cause the switching device to turn on and redirect an undesired electrical current through the switching device, wherein the output electrical current is split into the undesired electrical current through the switching device and a desired electrical current, wherein the desired electrical current continues to flow through the load; and apply an adjustable discharge current to the compensation terminal of the power converter, wherein the adjustable discharge current is separate from the output electrical current generated by the power converter.

Clause 2: The circuit of clause 1, wherein the driver circuit causes the switching device to turn on and to turn off based on the overshoot trigger threshold, which defines a pattern of square wave pulses, wherein characteristics of the pattern of square wave pulses comprise a pulse density; wherein characteristics of a square wave pulse of the pattern of square wave pulses comprises a duration of the square wave pulse, wherein a magnitude of the adjustable discharge current delivered to the compensation terminal is based on both: the duration of the square wave pulse, wherein the duration of the square wave pulse is the duration that the switching device is turned on; and the pulse density.

Clause 3: The circuit of clause 2, wherein the driver circuit is configured to increase the magnitude of the adjustable discharge current in response to an increase in the duration of the square wave pulse.

Clause 4: The circuit of any of clauses 2 and 3, wherein the driver circuit is configured to increase the magnitude of the adjustable discharge current in response to an increase in the pulse density.

Clause 5: The circuit of any of clauses 1 through 4, wherein the driver circuit comprises a counter that is configured to determine the magnitude of the adjustable discharge current based on the pattern of square wave pulses.

Clause 6: The circuit of clause 5, wherein the magnitude of the electrical current through the load satisfies the overshoot trigger threshold at the first time; and wherein, in response to determining that the magnitude of the electrical current through the load fails to satisfy the overshoot trigger threshold at a second time subsequent to the first time, the driver circuit is further configured to change the adjustable discharge current to a second current level different from the first current level, wherein, in response to determining that the magnitude of the electrical current through the load satisfies the overshoot trigger threshold at a third time subsequent to the second time, the driver circuit is configured to increase the adjustable discharge current.

Clause 7: The circuit of clause 6, wherein the driver circuit is further configured to turn off the adjustable discharge current when the counter is less than or equal to zero.

Clause 8: The circuit of any of clauses 1 through 7, wherein the magnitude of the electrical current through the load satisfies the overshoot trigger threshold at a first time; wherein the driver circuit is configured to deliver the adjustable discharge current to the compensation terminal at a first current level, subsequent to the first time; wherein, in response to determining that the magnitude of the electrical current continues to satisfy the overshoot trigger threshold at a second time subsequent to the first time, the driver circuit is further configured to change the adjustable discharge current to a second current level different from the first current level; wherein the second current level is a higher magnitude of current than the first current level, and wherein the driver circuit is configured to increase the current level to the second current level in response to the counter satisfying a counter threshold.

Clause 9: The circuit of any of clauses 1 through 8, wherein the load comprises a string of light emitting diodes (LED).

Clause 10: A system configured to control power delivered to a load comprising a power source; a load controller configured to control operation of the load; a power converter comprising a compensation terminal, wherein the power converter is configured to generate an output electrical current, wherein at least a portion of the output electrical current flows through the load; a switching device; a sensor configured to generate an electrical signal to indicate a magnitude of the electrical current through the load; and a driver circuit configured to protect the load from overshoot of the electrical current, wherein to protect from overshoot of the electrical current, the driver circuit is configured to: compare the magnitude of the electrical current through the load to an overshoot trigger threshold; in response to determining that the magnitude of the electrical current through the load satisfies the overshoot trigger threshold, cause the switching device to turn on and redirect an undesired electrical current through the switching device, wherein the f the output electrical current is split into the undesired electrical current through the switching device, and a desired electrical current, wherein the desired electrical current continues to flow through the load; and apply an adjustable discharge current to the compensation terminal of the power converter, wherein the adjustable discharge current is separate from the electrical current generated by the power converter.

Clause 11: The system of clause 10, wherein the load comprises a string of light emitting diodes (LED), and wherein the load controller is configured to turn ON or to turn OFF at least one LED of the string of LEDs.

Clause 12: The system of any of clauses 10 and 11, wherein the magnitude of the electrical current through the load satisfies the overshoot trigger threshold at a first time; and wherein, in response to determining that the magnitude of the electrical current through the load fails to satisfy the overshoot trigger threshold at a second time subsequent to the first time, the driver circuit is further configured to change the adjustable discharge current to a second current level different from the first current level, wherein, in response to determining that the magnitude of the electrical current through the load satisfies the overshoot trigger threshold at a third time subsequent to the second time, the driver circuit is configured to increase the adjustable discharge current.

Clause 13: The system of any of clauses 10 through 12, wherein the driver circuit comprises a counter that is configured to determine the magnitude of the adjustable discharge current based on the pattern of square wave pulses, and wherein the driver circuit is configured to increase the current level to the second current level unless the counter satisfies a counter threshold.

Clause 14: The system of any of clauses 10 through 13, wherein the magnitude of the electrical current through the load satisfies the overshoot trigger threshold at a first time; wherein the driver circuit is configured to apply the adjustable discharge current to the compensation terminal at a first current level, subsequent to the first time; and wherein, in response to determining that the magnitude of the electrical current through the load continues to satisfy the overshoot trigger threshold at a second time subsequent to the first time, the driver circuit is further configured to change the adjustable discharge current to a second current level different from the first current level.

Clause 15: The system of clause 14, wherein the second current level is a higher magnitude of current than the first current level.

Clause 16: The system of any of clauses 10 through 15, wherein the driver circuit causes the switching device to turn on and to turn off based on the overshoot trigger threshold that defines a pattern of square wave pulses, wherein characteristics of the pattern of square wave pulses comprise a pulse density; wherein characteristics of a square wave pulse of the pattern of square wave pulses comprises a duration of the square wave pulse, wherein a magnitude of the adjustable discharge current delivered to the compensation terminal is based on both: the duration of the square wave pulse, wherein the duration of the square wave pulse is the duration that the switching device is turned on; and the pulse density.

Clause 17: The system of clause 16, wherein the driver circuit is configured to increase the magnitude of the adjustable discharge current in response to an increase in the duration of the square wave pulse.

Clause 18: The system of any of clauses 16 and 17, wherein the driver circuit is configured to increase the magnitude of the adjustable discharge current in response to an increase in the pulse density.

Clause 19: A method of protecting a load from electrical current overshoot comprising receiving, from a sensor, an electrical signal indicating a magnitude of an output electrical current, wherein at least some of the output electrical current flows through the load, and wherein a power converter comprising a compensation terminal, delivers the output electrical current; comparing the indicated magnitude of the electrical current through the load to an overshoot trigger threshold; in response to determining that the magnitude of the first portion of the electrical current through the load satisfies the overshoot trigger threshold: causing a switching device to turn on and splitting the first portion of the electrical current into: an undesired electrical current through the switching device; and a desired electrical current, wherein the desired electrical current continues to flow through the load; and delivering an adjustable discharge current to the compensation terminal of the power converter, wherein the adjustable discharge current is separate from the electrical current generated by the power converter.

Clause 20: The method of clause 19, further comprising causing the switching device to turn on and to turn off based on the overshoot trigger threshold, which defines a pattern of square wave pulses, wherein characteristics of the pattern of square wave pulses comprise a pulse density; wherein characteristics of a square wave pulse of the pattern of square wave pulses comprise a duration of the square wave pulse, wherein a magnitude of the adjustable discharge current delivered to the compensation terminal is based on both: the duration of the square wave pulse, wherein the duration of the square wave pulse is the duration that the switching device is turned on; and the pulse density.

Various examples of the disclosure have been described. These and other examples are within the scope of the following claims.

What is claimed is:

1. A circuit configured to control power delivered to a load, the circuit comprising:
  a power converter comprising a compensation terminal, wherein the power converter is configured to generate an output electrical current, wherein at least a portion of the output electrical current flows through the load;
  a switching device;
  a sensor configured to generate an electrical signal to indicate a magnitude of electrical current through the load; and a driver circuit configured to protect the load from an overshoot of electrical current, wherein to protect from the overshoot of electrical current, the driver circuit is configured to:
  compare the magnitude of electrical current through the load to an overshoot trigger threshold;
  in response to determining that the magnitude of electrical current through the load satisfies the overshoot trigger threshold, cause the switching device to turn on and redirect an undesired electrical current through the switching device, wherein the output electrical current is split into the undesired electrical current through the switching device and a desired electrical current, wherein the desired electrical current continues to flow through the load; and
  apply an adjustable discharge current to the compensation terminal of the power converter, wherein the adjustable discharge current is separate from the output electrical current generated by the power converter,
  wherein the driver circuit causes the switching device to turn on and to turn off based on the overshoot trigger threshold, which defines a pattern of square wave pulses,
wherein characteristics of the pattern of square wave pulses comprise a pulse density;
wherein characteristics of a square wave pulse of the pattern of square wave pulses comprises a duration of the square wave pulse,
wherein a magnitude of the adjustable discharge current delivered to the compensation terminal is based on both:
  the duration of the square wave pulse, wherein the duration of the square wave pulse corresponds to a duration that the switching device is turned on; and
  the pulse density.

2. The circuit of claim 1, wherein the driver circuit is configured to increase the magnitude of the adjustable discharge current in response to an increase in the duration of the square wave pulse.

3. The circuit of claim 1, wherein the driver circuit is configured to increase the magnitude of the adjustable discharge current in response to an increase in the pulse density.

4. The circuit of claim 1, wherein the driver circuit comprises a counter that is configured to determine the magnitude of the adjustable discharge current based on the pattern of square wave pulses.

5. The circuit of claim 4,
  wherein the magnitude of electrical current through the load satisfies the overshoot trigger threshold at a first time; and
  wherein, in response to determining that the magnitude of electrical current through the load fails to satisfy the overshoot trigger threshold at a second time subsequent to the first time, the driver circuit is further configured to change the adjustable discharge current to a second current level different from a first current level,
  wherein, in response to determining that the magnitude of electrical current through the load satisfies the overshoot trigger threshold at a third time subsequent to the second time, the driver circuit is configured to increase the adjustable discharge current.

6. The circuit of claim 5, wherein the driver circuit is further configured to turn off the adjustable discharge current when the counter is less than or equal to zero.

7. The circuit of claim 4,
  wherein the magnitude of electrical current through the load satisfies the overshoot trigger threshold at a first time;
  wherein the driver circuit is configured to deliver the adjustable discharge current to the compensation terminal at a first current level, subsequent to the first time;
  wherein, in response to determining that the magnitude of electrical current continues to satisfy the overshoot trigger threshold at a second time subsequent to the first time, the driver circuit is further configured to change the adjustable discharge current to a second current level different from the first current level;
  wherein the second current level is a higher magnitude of current than the first current level, and
  wherein the driver circuit is configured to increase to the second current level in response to the counter satisfying a counter threshold.

8. The circuit of claim 1, wherein the load comprises a string of light emitting diodes (LED).

9. A system configured to control power delivered to a load, the system comprising:
  a power source;
  a load controller configured to control operation of the load;
  a power converter comprising a compensation terminal, wherein the power converter is configured to generate an output electrical current;
  a switching device;
  a sensor configured to generate an electrical signal to indicate a magnitude of electrical current through the load; and
  a driver circuit configured to protect the load from an overshoot of electrical current, wherein to protect from the overshoot of electrical current, the driver circuit is configured to:
  compare the magnitude of electrical current through the load to an overshoot trigger threshold;
  in response to determining that the magnitude of electrical current through the load satisfies the overshoot trigger threshold, cause the switching device to turn on and redirect an undesired electrical current through the switching device, wherein the output electrical current is split into the undesired electrical current through the switching device, and a desired electrical current, wherein the desired electrical current continues to flow through the load; and
  apply an adjustable discharge current to the compensation terminal of the power converter, wherein the adjustable discharge current is separate from the output electrical current generated by the power converter,
  wherein the driver circuit causes the switching device to turn on and to turn off based on the overshoot trigger threshold that defines a pattern of square wave pulses,
  wherein characteristics of the pattern of square wave pulses comprise a pulse density;
  wherein characteristics of a square wave pulse of the pattern of square wave pulses comprises a duration of the square wave pulse,
  wherein a magnitude of the adjustable discharge current delivered to the compensation terminal is based on both:
    the duration of the square wave pulse, wherein the duration of the square wave pulse is the duration that the switching device is turned on; and
    the pulse density.

10. The system of claim 9,
wherein the load comprises a string of light emitting diodes (LED), and
wherein the load controller is configured to turn ON or to turn OFF at least one LED of the string of LEDs.

11. The system of claim 9,
wherein the magnitude of electrical current through the load satisfies the overshoot trigger threshold at a first time; and
wherein, in response to determining that the magnitude of electrical current through the load fails to satisfy the overshoot trigger threshold at a second time subsequent to the first time, the driver circuit is further configured to change the adjustable discharge current to a second current level different from a first current level,
wherein, in response to determining that the magnitude of electrical current through the load satisfies the overshoot trigger threshold at a third time subsequent to the second time, the driver circuit is configured to increase the adjustable discharge current.

12. The system of claim 11,
wherein the driver circuit comprises a counter that is configured to determine a magnitude of the adjustable discharge current based on the pattern of square wave pulses, and
wherein the driver circuit is configured to increase to the second current level unless the counter satisfies a counter threshold.

13. The system of claim 9,
wherein the magnitude of electrical current through the load satisfies the overshoot trigger threshold at a first time;
wherein the driver circuit is configured to apply the adjustable discharge current to the compensation terminal at a first current level, subsequent to the first time; and
wherein, in response to determining that the magnitude of electrical current through the load continues to satisfy the overshoot trigger threshold at a second time subsequent to the first time, the driver circuit is further configured to change the adjustable discharge current to a second current level different from the first current level.

14. The system of claim 13, wherein the second current level is a higher magnitude of current than the first current level.

15. The system of claim 9, wherein the driver circuit is configured to increase the magnitude of adjustable discharge current in response to an increase in the duration of the square wave pulse.

16. The system of claim 9, wherein the driver circuit is configured to increase the magnitude of the adjustable discharge current in response to an increase in the pulse density.

17. A method of protecting a load from electrical current overshoot, the method comprising:
receiving, from a sensor, an electrical signal indicating a magnitude of an output electrical current,
wherein at least some of the output electrical current flows through the load, and
wherein a power converter, comprising a compensation terminal, delivers the output electrical current;
comparing the indicated magnitude of the electrical current through the load to an overshoot trigger threshold;
in response to determining that the magnitude of the electrical current through the load satisfies the overshoot trigger threshold:
causing a switching device to turn on and splitting the output electrical current into:
an undesired electrical current through the switching device; and
a desired electrical current, wherein the desired electrical current continues to flow through the load; and
delivering an adjustable discharge current to the compensation terminal of the power converter, wherein the adjustable discharge current is separate from the electrical current generated by the power converter, wherein the method further comprises:
causing the switching device to turn on and to turn off based on the overshoot trigger threshold, which defines a pattern of square wave pulses,
wherein characteristics of the pattern of square wave pulses comprise a pulse density;
wherein characteristics of a square wave pulse of the pattern of square wave pulses comprise a duration of the square wave pulse,
wherein a magnitude of the adjustable discharge current delivered to the compensation terminal is based on both:
the duration of the square wave pulse, wherein the duration of the square wave pulse is the duration that the switching device is turned on; and
the pulse density.

18. A circuit configured to control power delivered to a load, the circuit comprising:
a power converter comprising a compensation terminal, wherein the power converter is configured to generate an output electrical current, wherein at least a portion of the output electrical current flows through the load;
a switching device;
a sensor configured to generate an electrical signal to indicate a magnitude of electrical current through the load; and
a driver circuit configured to protect the load from an overshoot of electrical current, wherein to protect from the overshoot of electrical current, the driver circuit is configured to:
compare the magnitude of electrical current through the load to an overshoot trigger threshold;
in response to determining that the magnitude of electrical current through the load satisfies the overshoot trigger threshold, cause the switching device to turn on and off, which defines a pattern of square waves, so as to redirect an undesired electrical current through the switching device, wherein the output electrical current is split into the undesired electrical current through the switching device and a desired electrical current, wherein
the desired electrical current continues to flow through the load; and
apply an adjustable discharge current to the compensation terminal of the power converter, wherein the adjustable discharge current is separate from the output electrical current generated by the power converter, wherein
the driver circuit comprises a counter that is configured to determine a magnitude of the adjustable discharge current based on the pattern of square wave pulses.

19. The circuit of claim 18,
wherein the magnitude of electrical current through the load satisfies the overshoot trigger threshold at a first time; and
wherein, in response to determining that the magnitude of electrical current through the load fails to satisfy the overshoot trigger threshold at a second time subsequent to the first time, the driver circuit is further configured to change the adjustable discharge current to a second current level different from a first current level, wherein, in response to determining that the magnitude of electrical current through the load satisfies the overshoot trigger threshold at a third time subsequent to the second time, the driver circuit is configured to increase the adjustable discharge current.

20. The circuit of claim 18, wherein the magnitude of electrical current through the load satisfies the overshoot trigger threshold at a first time;

wherein the driver circuit is configured to deliver the adjustable discharge current to the compensation terminal at a first current level, subsequent to the first time;

wherein, in response to determining that the magnitude of electrical current continues to satisfy the overshoot trigger threshold at a second time subsequent to the first time, the driver circuit is further configured to change the adjustable discharge current to a second current level different from the first current level;

wherein the second current level is a higher magnitude of current than the first current level, and wherein the driver circuit is configured to increase to the second current level in response to the counter satisfying a counter threshold.

* * * * *